United States Patent
Ota (10) Patent No.: US 10,274,816 B2
(45) Date of Patent: Apr. 30, 2019

(54) DISPLAY DEVICE, PROJECTOR, AND DISPLAY CONTROL METHOD

(71) Applicant: SEIKO EPSON CORPORATION, Tokyo (JP)

(72) Inventor: Koichiro Ota, Omachi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 106 days.

(21) Appl. No.: 15/523,545

(22) PCT Filed: Oct. 29, 2015

(86) PCT No.: PCT/JP2015/005446
§ 371 (c)(1),
(2) Date: May 1, 2017

(87) PCT Pub. No.: WO2016/072073
PCT Pub. Date: May 12, 2016

(65) Prior Publication Data
US 2017/0307970 A1    Oct. 26, 2017

(30) Foreign Application Priority Data
Nov. 6, 2014    (JP) .................................. 2014-226044

(51) Int. Cl.
*G03B 21/20*    (2006.01)
*G06F 9/54*    (2006.01)
(Continued)

(52) U.S. Cl.
CPC ....... *G03B 21/2053* (2013.01); *G02B 26/023* (2013.01); *G02B 27/1026* (2013.01);
(Continued)

(58) Field of Classification Search
None
See application file for complete search history.

(56) References Cited

U.S. PATENT DOCUMENTS

| 8,788,950 B2 | 7/2014 | Ivashin et al. |
| 2007/0079249 A1 | 4/2007 | Pall et al. |

(Continued)

FOREIGN PATENT DOCUMENTS

| EP | 2 637 098 A1 | 9/2013 |
| JP | 2010-97522 A | 4/2010 |

(Continued)

OTHER PUBLICATIONS

Jan. 26, 2016 International Search Report issued in International Patent Application No. PCT/JP2015/005446.
May 16, 2018 Extended Search Report issued in European Patent Application No. 15857740.3.

*Primary Examiner* — Duane N Taylor, Jr.
(74) *Attorney, Agent, or Firm* — Oliff PLC (57) ABSTRACT

A display device includes: a display unit which displays an image; a detection unit which detects positions of first and second pointers on the image; a storage unit having a storage area corresponding to the pointers; a storage control unit which causes first and second virtual objects associated with the first and second pointers to be stored in the storage area, with the first and second virtual objects corresponding to first and second identifiers, respectively; and a pasting unit which pastes the first virtual object stored corresponding to the first identifier in the storage area to the image in response to an operation of the first pointer, and which pastes the second virtual object stored corresponding to the second identifier in the storage area to the image in response to an operation of the second pointer.

9 Claims, 4 Drawing Sheets

(51) Int. Cl.
*G02B 26/02* (2006.01)
*G02B 27/10* (2006.01)
*G06F 3/0488* (2013.01)
*G06F 3/042* (2006.01)
*G06F 3/0354* (2013.01)
*G06F 3/0484* (2013.01)
*H04N 9/31* (2006.01)

(52) U.S. Cl.
CPC ........ *G06F 3/03545* (2013.01); *G06F 3/0425* (2013.01); *G06F 3/0488* (2013.01); *G06F 3/04842* (2013.01); *G06F 9/54* (2013.01); *G06F 2203/04807* (2013.01); *H04N 9/3155* (2013.01); *H04N 9/3182* (2013.01)

(56) References Cited

U.S. PATENT DOCUMENTS

2013/0300658 A1  11/2013  Endo et al.
2016/0018905 A1* 1/2016  Nagao .................... G06F 3/033
                                                    345/157
2017/0097737 A1  4/2017  Ota

FOREIGN PATENT DOCUMENTS

| | | |
|---|---|---|
| JP | 2013-168142 A | 8/2013 |
| JP | 2013-235416 A | 11/2013 |
| JP | 2014-99023 A | 5/2014 |
| WO | 2015/146129 A1 | 10/2015 |

* cited by examiner

DISPLAY DEVICE, PROJECTOR, AND DISPLAY CONTROL METHOD

TECHNICAL FIELD

The present invention relates to a display device, a projector and a display control method for displaying an image corresponding to a position indicated by a pointer.

BACKGROUND ART

A technique in which a display device such as a projector detects the position of a digital pen (pointer) on a screen and projects an image (hand-drawn image) corresponding to a trace of the digital pen is known. This function is called an electronic blackboard function or electronic whiteboard function. A projector with the electronic blackboard function divides the screen into a plurality of areas, taking advantage of the large size of the screen, and draws hand-drawn images separately in the individual areas, using a plurality of digital pens (PTL 1 and PTL 2, for example).

CITATION LIST

Patent Literature

PTL 1: JP-A-2013-168142
PTL 2: JP-A-2013-235416

SUMMARY OF INVENTION

Technical Problem

In an electronic blackboard system, cut-and-paste and copy-and-paste functions, commonly used in personal computers, can be used. However, the techniques disclosed in PTL 1 and PTL 2 have a problem that if, after cutting and before pasting a virtual object with a first pointer, a different virtual object is cut with a second pointer, data of the different virtual object is stored in a storage area called a clipboard buffer and subsequently the different virtual object is pasted if an instruction to paste is given with the first pointer.

Meanwhile, the invention provides a technique which improves the convenience of the cut-and-paste or copy-and-paste function in a display device which displays images corresponding to the positions of a plurality of pointers.

Solution to Problem

The invention provides a display device including: a display unit which displays an image; a detection unit which detects a position of a first pointer and a position of a second pointer, on the image; a storage unit having a storage area corresponding to the first pointer and the second pointer; a storage control unit which causes a first virtual object associated with the first pointer to be stored in the storage area, with the first virtual object corresponding to a first identifier identifying the first pointer, and which causes a second virtual object associated with the second pointer to be stored in the storage area, with the second virtual object corresponding to a second identifier identifying the second pointer; and a pasting unit which pastes the first virtual object stored corresponding to the first identifier in the storage area to the image in response to an operation of the first pointer, and which pastes the second virtual object stored corresponding to the second identifier in the storage area to the image in response to an operation of the second pointer. According to this display device, cut-and-paste or copy-and-paste can be carried out separately with the first pointer and the second pointer.

This display device may include a switching unit which switches an operation mode of the pasting unit to one of a plurality of operation modes including a first mode and a second mode. In the first mode, the pasting unit may paste the first virtual object stored corresponding to the first identifier in the storage area to the image in response to an operation of the first pointer, and paste the second virtual object stored corresponding to the second identifier in the storage area, to the image in response to an operation of the second pointer. In the second mode, the pasting unit may paste a virtual object that is stored last in the storage area, of the first virtual object and the second virtual object, to the image in response to an operation of the first pointer or the second pointer. According to this display device, the mode can be switched between the mode in which cut-and-paste or copy-and-paste is carried out separately with the first pointer and the second pointer and the mode in which cut-and-paste or copy-and-paste is carried out with the first pointer and the second pointer in common.

The detection unit may detect a position of a third pointer on the image. The pasting unit may paste a virtual object that is stored last in the storage area, of the first virtual object and the second virtual object, to the image in response to an operation of the third pointer. According to this display device, cut-and-paste or copy-and-paste can be carried out with the third pointer in common with the first pointer and the second pointer.

The third pointer may be a finger of a user. According to this display device, cut-and-paste or copy-and-paste can be carried out with the user's finger in common with the first pointer and the second pointer.

The first virtual object may be a virtual object on which an instruction to copy is given using the first pointer. According to this display device, copy-and-paste can be carried out on a virtual object on which an instruction to copy is given with the first pointer.

The first virtual object may be a virtual object drawn using the first pointer. According to this display device, cut-and-paste or copy-and-paste can be carried out on a virtual object drawn with the first pointer.

In the display device, the first virtual object may be a virtual object selected using the first pointer. According to this display device, cut-and-paste or copy-and-paste can be carried out on a virtual object selected with the first pointer.

The invention also provides a projector including: a projection unit which projects an image; a detection unit which detects a position of a first pointer and a position of a second pointer, on the image; a storage unit having a storage area corresponding to the first pointer and the second pointer; a storage control unit which causes a first virtual object associated with the first pointer to be stored in the storage area, with the first virtual object corresponding to a first identifier identifying the first pointer, and which causes a second virtual object associated with the second pointer to be stored in the storage area, with the second virtual object corresponding to a second identifier identifying the second pointer; and a pasting unit which pastes the first virtual object stored corresponding to the first identifier in the storage area to the image in response to an operation of the first pointer, and which pastes the second virtual object stored corresponding to the second identifier in the storage area to the image in response to an operation of the second pointer. According to this projector, cut-and-paste or copy-and-paste can be carried out separately with the first pointer and the second pointer.

Moreover, the invention provides a display control method in a display device including a display unit which displays an image and a storage unit having a storage area corresponding to a first pointer and a second pointer. The method includes: detecting a position of the first pointer and a position of the second pointer, on the image; causing a first virtual object associated with the first pointer to be stored in the storage area, with the first virtual object corresponding to a first identifier identifying the first pointer, and causing a second virtual object associated with the second pointer to be stored in the storage area, with the second virtual object corresponding to a second identifier identifying the second pointer; and pasting the first virtual object stored corresponding to the first identifier in the storage area to the image in response to an operation of the first pointer, and pasting the second virtual object stored corresponding to the second identifier in the storage area to the image in response to an operation of the second pointer. According to this display control method, cut-and-paste or copy-and-paste can be carried out separately with the first pointer and the second pointer.

DESCRIPTION OF EMBODIMENTS

1. Configuration

Figure 1:
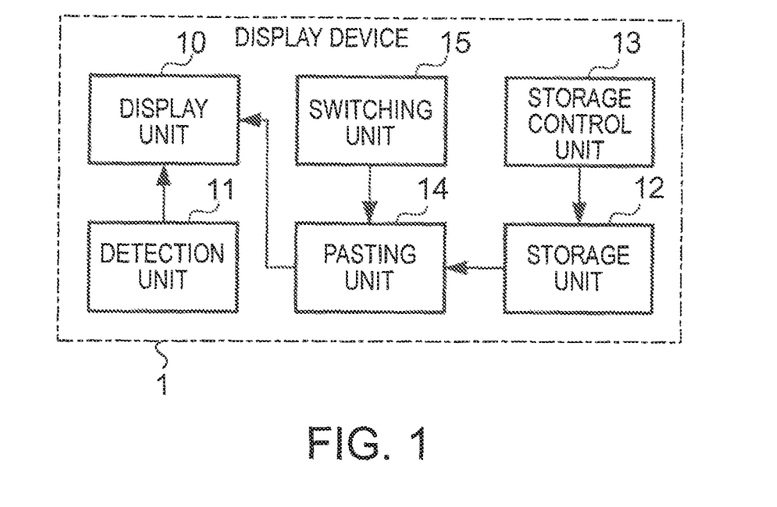
FIG. 1 is a view showing the functional configuration of a display device 1 according to an embodiment.

FIG. 1 is a view showing the functional configuration of a display device 1 according to an embodiment. The display device 1 is a device which displays an image corresponding to a trace of a pointer (digital pen, for example). The display device 1 has the function of separately detecting traces of two pointers, that is, a first pointer and a second pointer.

The display device 1 includes a display unit 10, a detection unit 11, a storage unit 12, a storage control unit 13, a pasting unit 14, and a switching unit 15. The display unit 10 displays an image corresponding to image data supplied thereto. The detection unit 11 detects the position of the first pointer and the position of the second pointer. The storage unit 12 has a storage area corresponding to the first pointer and the second pointer and stores a first virtual object and a second virtual object. The first virtual object is a virtual object associated with the first pointer. The second virtual object is a virtual object associated with the second pointer. A virtual object is an object that is virtual and expressed by data, for example, an image, line drawing, graphic pattern, icon or character string. The storage control unit 13 causes the first virtual object to be stored in the storage area of the storage unit 12, corresponding to a first identifier, and causes the second virtual object to be stored in the storage area of the storage unit 12, corresponding to a second identifier. The first identifier is an identifier which identifies the first pointer. The second identifier is an identifier which identifies the second pointer. The pasting unit 14 pastes the virtual objects stored in the storage area of the storage unit 12 to the image displayed by the display unit 10 in response to an operation of the pointers. The switching unit 15 switches the operation mode of the pasting unit 14 to one of a plurality of operation modes including a first mode and a second mode. In the first mode, the pasting unit 14 pastes the first virtual object stored corresponding to the first identifier in the storage area to the image in response to an operation of the first pointer, and pastes the second virtual object stored corresponding to the second identifier in the storage area to the image in response to an operation of the second pointer. Meanwhile, in the second mode, the pasting unit 14 pastes the virtual object that is stored last in the storage area of the storage unit 12, of the first virtual object and the second virtual object, to the image in response to an operation of the first pointer or the second pointer.

Figure 2:
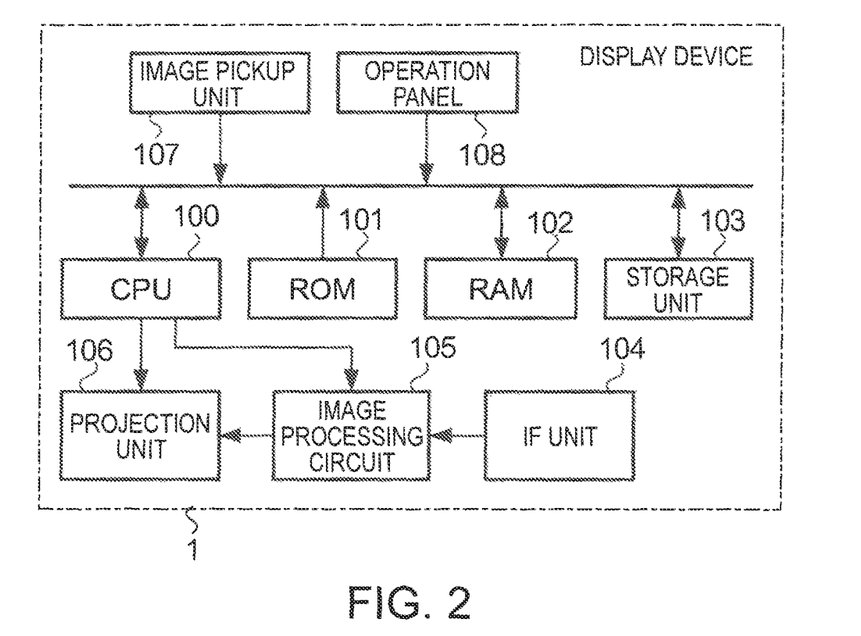
FIG. 2 is a view illustrating the hardware configuration of the display device 1 according to the embodiment.

FIG. 2 is a view illustrating the hardware configuration of the display device 1 according to the embodiment. In this example, the display device 1 is a projector having the so-called whiteboard function (also called the electronic blackboard function or interactive function in some cases). As pointers for the whiteboard function, a digital pen 2 and a digital pen 3 are used.

The display device 1 includes a CPU (central processing unit) 100, a ROM (read only memory) 101, a RAM (random access memory) 102, a storage unit 103, an IF (interface) unit 104, an image processing circuit 105, a projection unit 106, an image pickup unit 107, and an operation panel 108.

The CPU 100 is a control device which controls each component of the display device 1. The ROM 101 is a non-volatile storage device in which various programs and data are stored. The RAM 102 is a volatile storage device which stores data, and functions as a work area when the CPU 100 executes processing. The storage unit 103 is a non-volatile storage device which stores data and programs, such as an HDD (hard disk drive) or SSD (solid state drive), for example. In this example, the storage unit 103 stores a program for causing the display device 1 to implement the whiteboard function (hereinafter referred to as a "whiteboard program").

The IF unit 104 is an interface which mediates the communication of signals or data to and from an external device which serves as a video source. The IF unit 104 has a terminal for communicating signals or data to and from the external device (for example, a VGA terminal, USB terminal, wired LAN interface, S terminal, RCA terminal, HDMI (High-Definition Multimedia Interface: trademark registered) terminal, or the like) and a wireless LAN interface.

The image processing circuit 105 performs predetermined image processing on a video signal inputted thereto (hereinafter referred to as an "input video signal"). The projection unit 106 projects an image on a screen according to the video signal on which image processing is performed. The projection unit 106 has a light source, light modulator, an optical system, and a drive circuit for these (none of which is illustrated). The light source is a lamp such as a high-pressure mercury lamp, halogen lamp or metal halide lamp, or a solid-state light source such as an LED (light emitting diode) or laser diode. The light modulator is a device which modulates the light cast from the light source, according to the video signal, and includes a liquid crystal panel, for example. The optical system is an element which projects the light modulated by the light modulator, onto the screen, and has a lens and prism, for example. In this example, the light source and the light modulator are provided for each color component. Specifically, separate light sources and light modulators are provided for the primary colors of red, green and blue, respectively. The light modulated by the respective liquid crystal panels is combined by the optical system and projected on the screen.

The image pickup unit 107 picks up an image of an area including the screen where an image is projected, in order to specify the positions of the digital pen 2 and the digital pen 3. In this example, each of the digital pen 2 and the digital pen 3 has a light emitting element which outputs light with a unique wavelength, and a pressure sensor at the tip of the pen. As the pressure sensor detects pressure, the light emitting element outputs light. The CPU 100 detects the positions of the digital pen 2 and the digital pen 3, based on the positions of the points corresponding to the light with their wavelengths on the image picked up by the image pickup unit 107. The image pickup unit 107 picks up an image of the area including the screen on a predetermined cycle. Arranging the detected positions in time series provides the traces of the digital pens. The CPU 100 controls the image processing circuit 105 and the projection unit 106 to draw an image corresponding to the detected positions (trace) of the digital pen 2 and an image corresponding to the positions (trace) of the digital pen 3.

The operation panel 108 is an input device for the user to input instructions to the display device 1, and includes a keyboard, button or touch panel, for example.

In this example, the projection unit 106 is an example of the display unit 10 and an example of the projection unit. The image pickup unit 107 and the CPU 100 are an example of the detection unit 11. The RAM 102 is an example of the storage unit 12. The CPU 100 executing the whiteboard program is an example of the storage control unit 13, the pasting unit 14 and the switching unit 15.

2. Problems of Related-Art Technique

Before starting the explanation of this embodiment, problems of the related-art technique will be described.

Figure 3:
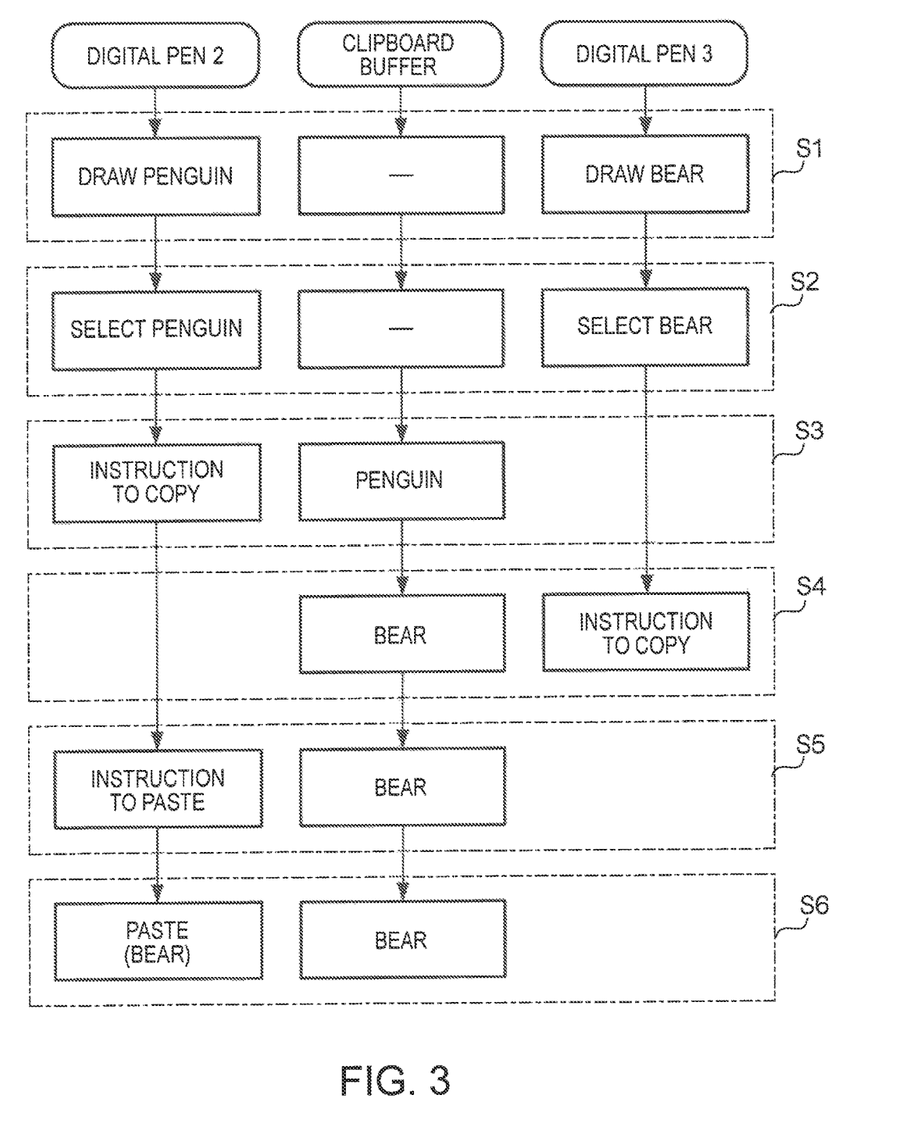
FIG. 3 is a flowchart showing operations of a display device 1 according to the related art.

FIG. 3 is a flowchart showing operations of a display device 1 according to the related art. In this example, the display device 1 has a clipboard buffer shared by a digital pen 2 and a digital pen 3. The clipboard buffer is a storage area to perform processing (such as cut, copy, paste, group, ungroup, and delete, for example) on a selected virtual object and to store (data of) the virtual object. This storage area is provided in the RAM 102. In the description below, software such as the whiteboard program may be described as the agent of operations. However, this means that the CPU 100 executing this software performs processing in collaboration with other hardware components.

In this example, a user A using the digital pen 2 and a user B using the digital pen 3, that is, a total of two users, are drawing images using the whiteboard function of the display device 1. In FIG. 3, operations of the digital pen 2, operations of the digital pen 3 and the virtual object stored in the clipboard buffer are shown. At the beginning of the flow of FIG. 3, nothing is stored in the clipboard buffer. Also, in the example of FIG. 3, only a single virtual object is stored in the clipboard buffer.

In Step S1, the user A draws a picture of a penguin. Meanwhile, the user B draws a picture of a bear.

In Step S2, the user A selects the picture of the penguin drawn by the user A him/herself. The user B selects the picture of the bear. The digital pen 2 and the digital pen 3 have a button to give an instruction to select a virtual object. If the user touches a virtual object or draws a graphic pattern surrounding virtual object while pressing this button, the virtual object is selected. As the virtual object is selected, the whiteboard program displays a menu including processing items that can be executed on the selected virtual object.

Figure 4:
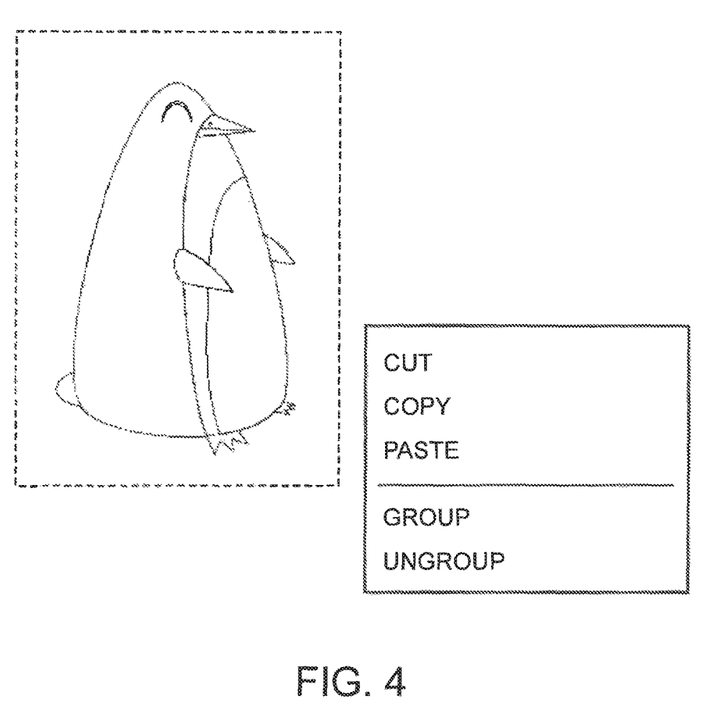
FIG. 4 is a view illustrating a processing menu.

FIG. 4 is a view illustrating the processing menu. In this example, processing of cutting, copying, pasting, grouping, ungrouping, and deleting can be executed on the selected virtual object. The whiteboard program executes processing corresponding to an item selected from these by the user.

FIG. 3 is referred to again. In Step S3, the user A copies the selected virtual object (in this example, the picture of the penguin) to the clipboard buffer. That is, the user A selects the item of "copy" from the menu in FIG. 4. At this point, the user B is not carrying out any operation on the menu. The picture of the penguin is stored in the clipboard buffer.

In Step S4, the user B copies the selected virtual object (in this example, the picture of the bear) to the clipboard buffer. That is, the user B selects the item of "copy" from the menu in FIG. 4. At this time, the user A is doing nothing. The picture of the bear is stored in the clipboard buffer. At this time, the picture of the penguin stored up to this point is deleted.

In Step S5, the user A gives an instruction to paste the virtual object onto the screen. For example, if the user A touches the screen with the digital pen 2 while pressing the button of the digital pen 2, the whiteboard program displays a menu including the item of "paste". If the user A selects the item of "paste" from this menu, an instruction to paste is given.

In Step S6, the whiteboard program pastes the virtual object stored in the clipboard buffer, that is, in this example, the picture of the bear, to a designated position on the screen.

At this time, which virtual object the user A intends to paste depends on circumstances. For example, if the user A is aware that the user B has copied the picture of the bear, it is conceivable that the user A intends to paste the picture of the bear. However, if the user A is unaware that the user B has copied the picture of the bear, it is conceivable that the user A intends to paste the picture of the penguin. In this case, the picture of the bear is pasted against the intention of the user A. This embodiment deals with such problems.

3. Operations

3-1. Operation Example 1

Figure 5:
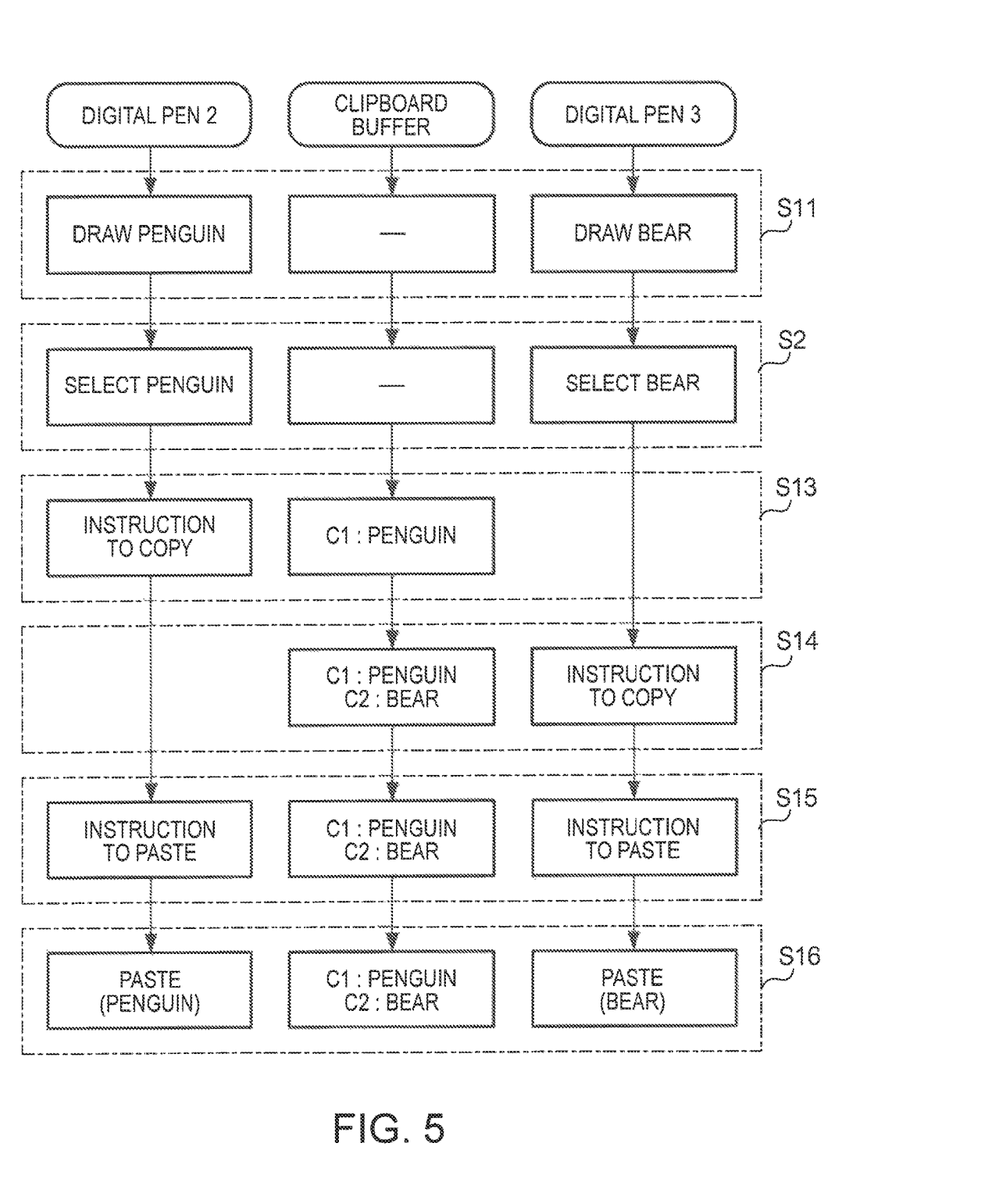
FIG. 5 is a flowchart showing operations of the display device 1 according to the embodiment.

FIG. 5 is a flowchart showing operations of the display device 1 according to the embodiment. In this example, a single clipboard buffer (that is, common to the digital pen 2 and the digital pen 3) is used to store virtual objects. A plurality of virtual objects (specifically, one virtual object corresponding to the digital pen 2 and one virtual object corresponding to the digital pen 3) is stored in the clipboard buffer. Also, the virtual objects are stored in the clipboard buffer, corresponding to identifiers identifying the digital pens.

In Step S11, the user A draws a picture of a penguin. Meanwhile, the user B draws a picture of a bear. In Step S12, the user A selects the picture of the bear drawn by the user A him/herself. The user B selects the picture of the bear.

In Step S13, the user A copies the selected virtual object (in this example, the picture of the penguin) to the clipboard buffer. That is, the user A selects the item of "copy" from the menu in FIG. 4. At this point, the user B is not carrying out any operation on the menu. The virtual object (picture of the penguin) selected by the user A is stored in the clipboard buffer. At this time, the whiteboard program stores the identifier of the digital pen 2 (in this example, C1) along with the selected virtual object in the clipboard buffer.

In Step S14, the user B copies the selected virtual object (in this example, the picture of the bear) to the clipboard buffer. That is, the user B selects the item "copy" from the menu in FIG. 4. The virtual object (picture of the bear) selected by the user B is stored in the clipboard buffer. At this time, the whiteboard program stores the identifier of the digital pen 3 (in this example, C2) along with the selected virtual object in the clipboard buffer.

In Step S15, the user A gives an instruction to paste the virtual object onto the screen. The user B, too, gives an instruction to paste the virtual object onto the screen.

In Step S16, the whiteboard program pastes the virtual objects. That is, the whiteboard program pastes the virtual object stored corresponding to the identifier C1 in the clipboard buffer, that is, in this example, the picture of the penguin, to the position indicated by the digital pen 2, and pastes the virtual object stored corresponding to the identifier C2 in the clipboard buffer, that is, in this example the picture of the bear, to the position indicated by the digital pen 3.

3-2. Operation Example 2

In the operation example 1, an example where the two digital pens are used by different users is described. However, the two digital pens can be used by one user. In this case, on assumption that the processing is underway as shown in FIG. 5, whether the virtual object which the user wants to paste in Step S15 is the virtual object corresponding to the identifier C1 or the virtual object corresponding to the identifier C2 depends on circumstances. Thus, in an operation example 2, the display device 1 has two operation modes, that is, a shared mode and an independent mode. The shared mode is an operation mode in which the virtual object that is stored last in the clipboard buffer is pasted regardless of the digital pen used. The independent mode is an operation mode in which the virtual object stored corresponding to the identifier of the digital pen used is pasted.

For example, an icon to access a screen for changing various settings is displayed on the screen displayed by the display device 1. The user can access this menu by touching this icon with the digital pen. This menu includes an item for switching between the operation modes.

In this case, in the shared mode, only the virtual object that is copied last may be stored in the clipboard buffer, or the order in which virtual objects are copied may be stored along with the virtual objects and the virtual object in the last place in the order may be pasted.

3-3. Operation Example 3

In the operation example 2, an example where the user changes a setting on the menu screen, thereby switching between the operation modes, is described. However, the whiteboard program may automatically switch between the operation modes. In this example, the whiteboard program switches between the operation modes according to whether the pointer used is a digital pen or a user's finger. Specifically, if a user's finger is used as the pointer, the operation mode is switched to the shared mode. If a digital pen is used as the pointer, the operation mode is switched to the independent mode. According to this operation example, the user can intuitively switch between the operation modes without any menu operations.

In this case, the whiteboard program has the function of recognizing an input made with the user's finger from an image picked up by the image pickup unit 107. Light parallel to the screen and with a uniform and unique wavelength is cast on the surface of the screen, and if the user's finger interrupts the light, the image pickup unit 107 captures and recognizes its reflection as the corresponding position. In this case, in order to discriminate this light from the light from the digital pen 2 or the digital pen 3, the light emission from the digital pens is carried out in a specific pattern, and the operations with the digital pens and with the finger are discriminated from each other by recognizing this pattern. Also, the function of recognizing the shape of a user's hand from an image picked up by the image pickup unit 107 may be provided. If the user's hand is in a specific shape (for example, with the forefinger up), the whiteboard program recognizes the hand as the pointer and recognizes the position of the tip of the forefinger as the position indicated by the pointer.

4. Modifications

The invention is not limited to the above embodiment and can be carried out with various modifications. Several modifications will be described below. Two or more of the modifications below may be used in combination.

Which pointer identified by an identifier the virtual object should correspond to when stored in the clipboard buffer, that is, the relation between the position of the pointer and the virtual object, is not limited to the example described in the embodiment. In the embodiment, the whiteboard program stores a virtual object in the clipboard buffer in the state where the virtual object corresponds to the identifier identifying the pointer with which an instruction to copy the virtual object is given. However, the whiteboard program may store a virtual object in the clipboard buffer in the state where the virtual object corresponds to the identifier identifying the pointer with which the virtual object is drawn. For example, if the picture of the penguin drawn with the digital pen 2 is selected with the digital pen 3, the picture of the penguin may be stored in the clipboard buffer in the state where the picture of the penguin corresponds to identifier C1. As another example, the whiteboard program may store a virtual object in the clipboard buffer in the state where the virtual object corresponds to the identifier identifying the pointer with which the virtual object is selected.

If a finger is used as the pointer, the whiteboard program may provide a clipboard buffer for the finger. In this case, the clipboard buffer for the digital pen and the clipboard buffer for the finger are properly used.

The capacity of the clipboard buffer is not limited to two virtual objects. The clipboard buffer may store three or more virtual objects.

The hardware to implement the functions shown in FIG. 1 is not limited to the illustration in FIG. 2. For example, the image pickup unit 107 may be omitted from the display device 1. In this case, the digital pen may detect its own position and notify the display device 1 of the detected position. Also, the projection unit 106 need not have light modulators for the respective color components and may have a single light modulator. Also, an electro-optic element other than a liquid crystal panel, such as a digital mirror device (DMD), may be used as the light modulator. Moreover, the display device 1 is not limited to a projector and may be a direct-view display device.

A part of the functions shown in FIG. 1 may be omitted. For example, the switching unit 15 may be omitted from the display device 1.

REFERENCE SIGNS LIST

1 . . . display device, 2 . . . digital pen, 3 . . . digital pen, 10 . . . display unit, 11 . . . detection unit, 12 . . . storage unit, 13 . . . storage control unit, 14 . . . pasting unit, 15 . . . switching unit, 100 . . . CPU, 101 . . . ROM, 102 . . . RAM, 103 . . . storage unit, 104 . . . IF unit, 105 . . . image processing circuit, 106 . . . projection unit, 107 . . . image pickup unit, 108 . . . operation panel.

The invention claimed is:

1. A display device that detects a position of a first pointer, a position of a second pointer, and a position of a third pointer on an image projected by the display device, the display device comprising:
   a memory including a storage area corresponding to the first pointer and the second pointer; and
   a processor programmed to:
      cause a first virtual object associated with the first pointer to be stored in the storage area, with the first virtual object corresponding to a first identifier identifying the first pointer,
      cause a second virtual object associated with the second pointer to be stored in the storage area, with the second virtual object corresponding to a second identifier identifying the second pointer,
      paste the first virtual object stored corresponding to the first identifier in the storage area to the image in response to an operation of the first pointer,
      paste the second virtual object stored corresponding to the second identifier in the storage area to the image in response to an operation of the second pointer, and
      paste a virtual object that is stored last in the storage area, of the first virtual object and the second virtual object, to the image in response to an operation of the third pointer.

2. The display device according to claim 1, wherein the processor is programmed to
   switch an operation mode of pasting to one of a plurality of operation modes including a first mode and a second mode,
   wherein in the first mode, the processor is programmed to paste the first virtual object stored corresponding to the first identifier in the storage area to the image in response to an operation of the first pointer, and pastes the second virtual object stored corresponding to the second identifier in the storage area to the image in response to an operation of the second pointer, and in the second mode, the processor is programmed to paste a virtual object that is stored last in the storage area, of the first virtual object and the second virtual object, to the image in response to an operation of the first pointer or the second pointer.

3. The display device according to claim 1, wherein the third pointer is a finger of a user.

4. The display device according to claim 1, wherein the first virtual object is a virtual object on which an instruction to copy is given using the first pointer.

5. The display device according to claim 1, wherein the first virtual object is a virtual object drawn using the first pointer.

6. The display device according to claim 1, wherein the first virtual object is a virtual object selected using the first pointer.

7. A projector that detects a position of a first pointer, a position of a second pointer, and a position of a third pointer on an image projected by the projector, the projector comprising:
   a memory including a storage area corresponding to the first pointer and the second pointer; and
   a processor programmed to:
      cause a first virtual object associated with the first pointer to be stored in the storage area, with the first virtual object corresponding to a first identifier identifying the first pointer,
      cause a second virtual object associated with the second pointer to be stored in the storage area, with the second virtual object corresponding to a second identifier identifying the second pointer,
      paste the first virtual object stored corresponding to the first identifier in the storage area to the image in response to an operation of the first pointer,
      paste the second virtual object stored corresponding to the second identifier in the storage area to the image in response to an operation of the second pointer, and
      paste a virtual object that is stored last in the storage area, of the first virtual object and the second virtual object, to the image in response to an operation of the third pointer.

8. A display control method in a display device that displays an image and includes a memory including a storage area corresponding to a first pointer and a second pointer, the method comprising:
   detecting a position of the first pointer and a position of the second pointer, on the image;
   causing a first virtual object associated with the first pointer to be stored in the storage area, with the first virtual object corresponding to a first identifier identifying the first pointer, and causing a second virtual object associated with the second pointer to be stored in the storage area, with the second virtual object corresponding to a second identifier identifying the second pointer;
   pasting the first virtual object stored corresponding to the first identifier in the storage area to the image in response to an operation of the first pointer, and pasting the second virtual object stored corresponding to the second identifier in the storage area to the image in response to an operation of the second pointer;
   detecting a position of a third pointer on the image; and
   pasting a virtual object that is stored last in the storage area, of the first virtual object and the second virtual object, to the image in response to an operation of the third pointer.

9. A display device that detects a position of a first pointer and a position of a second pointer on an image projected by the display device, the display device comprising:
   a memory including a storage area corresponding to the first pointer and the second pointer; and
   a processor programmed to:
      cause a first virtual object associated with the first pointer to be stored in the storage area, with the first virtual object corresponding to a first identifier identifying the first pointer,
      cause a second virtual object associated with the second pointer to be stored in the storage area, with the second virtual object corresponding to a second identifier identifying the second pointer,
      paste the first virtual object stored corresponding to the first identifier in the storage area to the image in response to an operation of the first pointer, paste the second virtual object stored corresponding to the second identifier in the storage area to the image in response to an operation of the second pointer; and switch an operation mode of the pasting unit to one of a plurality of operation modes including a first mode and a second mode, wherein in the first mode, the processor is programmed to paste the first virtual object stored corresponding to the first identifier in the storage area to the image in response to an operation of the first pointer, and paste the second virtual object stored corresponding to the second identifier in the storage area to the image in response to an operation of the second pointer, and in the second mode, the processor is programmed to paste a virtual object that is stored last in the storage area, of the first virtual object and the second virtual object, to the image in response to an operation of the first pointer or the second pointer.

\* \* \* \* \*